(12) United States Patent
Oogami

(10) Patent No.: US 7,166,387 B2
(45) Date of Patent: Jan. 23, 2007

(54) THIN BATTERY WITH AN ELECTRODE HAVING A HIGHER STRENGTH BASE PORTION THAN A TIP PORTION

(75) Inventor: Etsuo Oogami, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 424 days.

(21) Appl. No.: 10/454,502

(22) Filed: Jun. 5, 2003

(65) Prior Publication Data

US 2004/0001999 A1    Jan. 1, 2004

(30) Foreign Application Priority Data

Jun. 26, 2002    (JP) .............................. 2002-186123

(51) Int. Cl.
*H01M 6/12*    (2006.01)
*H01M 2/02*    (2006.01)

(52) U.S. Cl. ...................... 429/162; 429/178; 429/161; 429/179

(58) Field of Classification Search ................ 429/162, 429/161, 178, 179, 180, 185, 211, 223, 224, 429/176, 231.1
See application file for complete search history.

(56) References Cited

U.S. PATENT DOCUMENTS

| | | | | |
|---|---|---|---|---|
| 2001/0033962 | A1* | 10/2001 | Suzuki | 429/94 |
| 2002/0071985 | A1* | 6/2002 | Ooyama | 429/94 |
| 2004/0029001 | A1* | 2/2004 | Yamazaki et al. | 429/176 |
| 2004/0048151 | A1* | 3/2004 | Hayashi et al. | 429/162 |

FOREIGN PATENT DOCUMENTS

| | | |
|---|---|---|
| JP | 09-259859 A | 10/1997 |
| JP | 2001-052680 A | 2/2001 |
| JP | 2001-216950 A | 8/2001 |
| JP | 2001-222990 A | 8/2001 |
| JP | 2002-216740 * | 8/2002 |

* cited by examiner

*Primary Examiner*—Raymond Alejandro
(74) *Attorney, Agent, or Firm*—Global IP Counselors

(57) ABSTRACT

A thin battery is configured with improved durability of foil-like electrode terminals. The thin battery has an electricity-generating element housed inside a battery outer casing with a pair of electrodes of the electricity-generating element being connected to electrode terminals that extend out from the outer edges of the battery outer casing. The electrode terminals have a base portion located partially with the battery outer casing and a tip portion spaced from the battery outer casing with strength transition point being formed between the base portions and the tip portions. The strength transition points of the electrode terminals are positioned to the outside at some distance away from the outer edge of the battery outer casing.

18 Claims, 6 Drawing Sheets

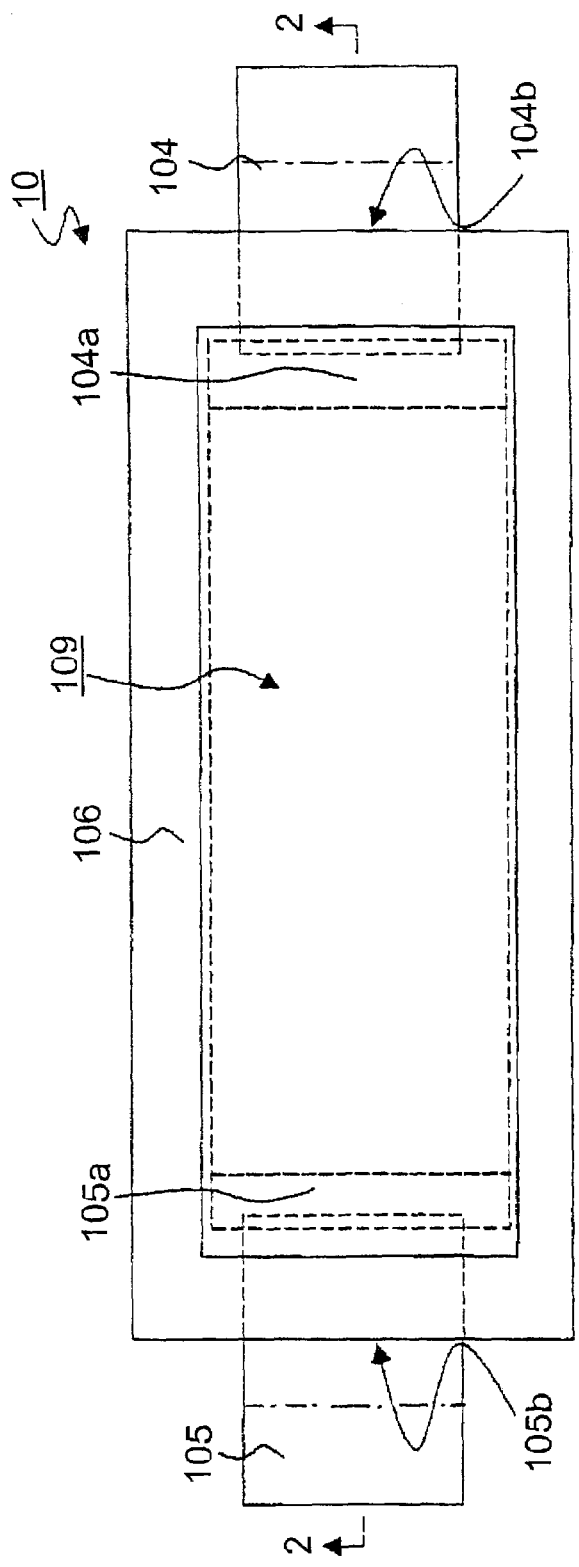
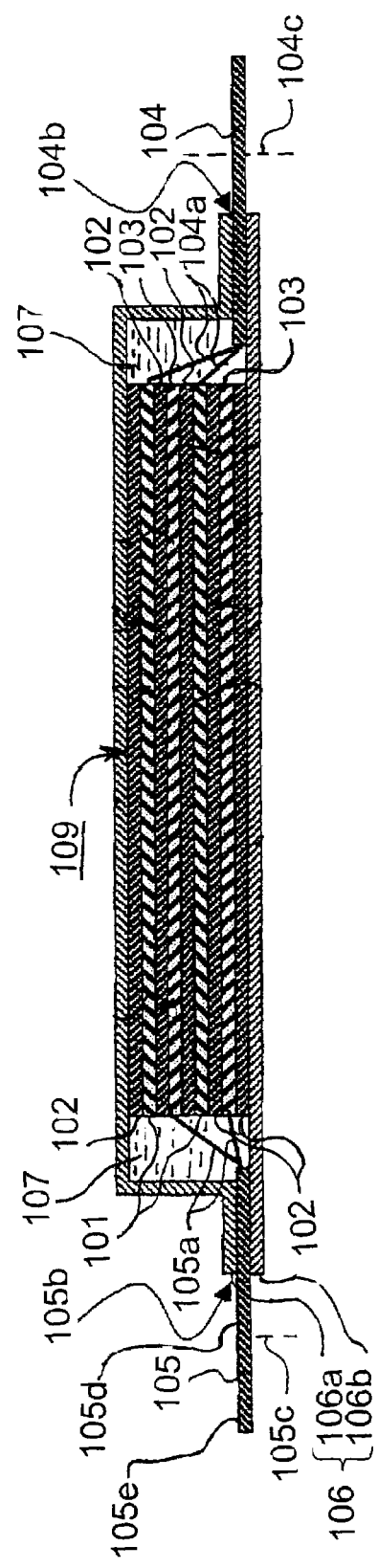
Fig. 1
Fig. 2

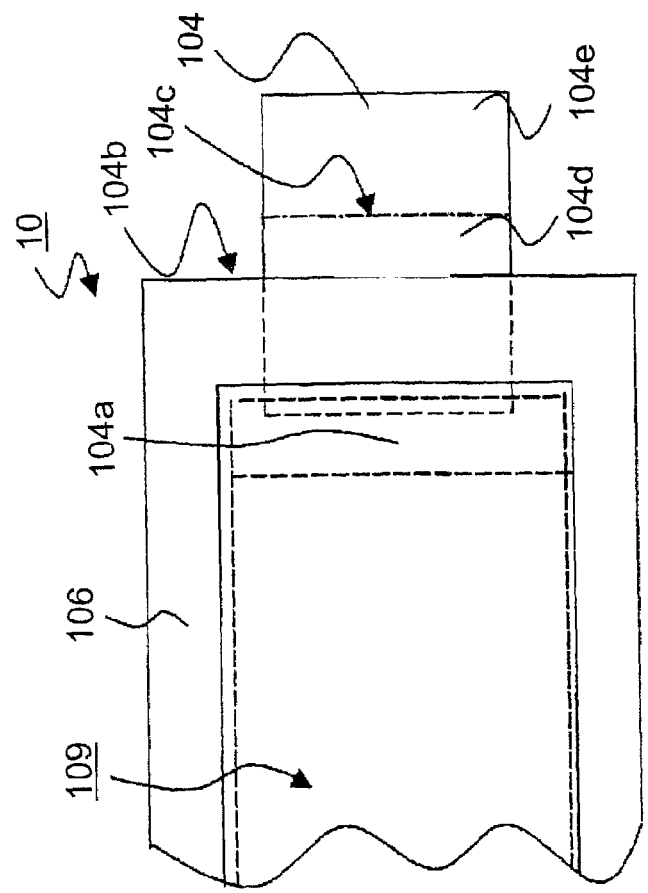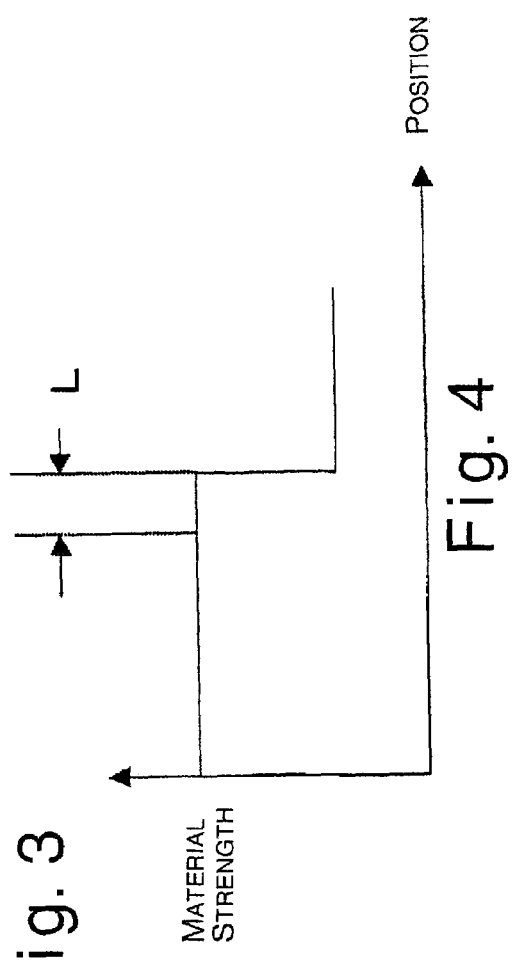

THIN BATTERY WITH AN ELECTRODE HAVING A HIGHER STRENGTH BASE PORTION THAN A TIP PORTION

BACKGROUND OF THE INVENTION

1. Field of the Invention

The present invention generally relates to a thin battery. More specifically, the present invention relates to a thin secondary battery having an electricity-generating element housed inside a battery outer casing and having foil-like electrode terminals.

2. Background Information

A battery is a device that produces electricity from a chemical reaction. A battery can be either a single cell or can include several cells connected together in series or parallel. A battery cell typically has one or more positive electrode, one or more negative electrode plates, one or more separators, and an electrolyte contained within a battery outer casing, and a positive electrode terminal and a negative electrode terminal protruding from the battery outer casing. The electrolyte may be aqueous (composed of water) or nonaqueous (not composed of water). When an external load is connected to the battery cell, the negative electrode supplies a current of electrons that flow through the load and are accepted by the positive electrode. This reaction continues until the external load is removed.

A secondary battery is commonly known as a rechargeable battery. In a secondary battery, a non-aqueous electrolyte is typically used, which is composed of organic liquids and salts of lithium to provide ionic conductivity. Thus, a secondary battery using a non-aqueous electrolyte has a much higher cell voltage than a battery using an aqueous electrolyte.

Recently, batteries have become thinner, smaller, and lightweight. Since thin batteries are small and lightweight, a plurality of thin batteries can be connected together and combined into a battery pack that provides high voltage and high capacity (e.g., Japanese Laid-Open Patent Publication No. 9-259859).

The positive and negative electrode terminals of the thin battery disclosed in Japanese Laid-Open Patent Publication No. 9-259859 are foil-like terminals made of such materials as aluminum foil and copper foil. Consequently, when the terminals are connected to make a battery pack, the stress generated in each terminal concentrates along the line where the terminal connects to the battery outer casing, causing the terminal to be easily broken.

In view of the above, it will be apparent to those skilled in the art from this disclosure that there exists a need for an improved thin battery. This invention addresses this need in the art as well as other needs, which will become apparent to those skilled in the art from this disclosure.

SUMMARY OF THE INVENTION

It has been discovered that in connecting the thin batteries, such as the ones disclosed in the above mentioned publication, together to make a battery pack that the stresses generated in each of the terminals are concentrated along a line where the terminals are connected to the battery outer casing. Thus, this concentration of stress can cause the terminals to be easily broken.

The object of the present invention is to improve the durability of foil-like electrode terminals.

The forgoing object can be basically attained by providing a thin battery thin battery comprising a battery outer casing, an electricity-generating element, a first electrode terminal, and a second electrode terminal. The electricity-generating element is disposed inside the battery outer casing. The first electrode terminal is electrically connected to the electricity-generating element. The second electrode terminal is electrically connected to the electricity-generating element and extends outwardly from the battery outer casing. The second electrode terminal includes a base portion having a first material strength and a tip portion having a second material strength that is lower than the first material strength of the base portion with a strength transition point formed between the base and tip portions at a location spaced from the battery outer casing.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1 is a full top plan view of a thin battery in accordance with a first embodiment of the present invention;

FIG. 2 is a longitudinal cross sectional view of the thin battery illustrated in FIG. 1 as seen along section line 2—2 of FIG. 1 in accordance with the first embodiment of the present invention;

FIG. 3 is an enlarged partial top plan view of the thin battery illustrated in FIGS. 1 and 2 in accordance with the first embodiment of the present invention;

FIG. 4 is a graph showing the material strength of the positive electrode terminal relative to the longitudinal position in accordance with the first embodiment of the present invention;

DETAILED DESCRIPTION OF THE PREFERRED EMBODIMENTS

Figure 6:
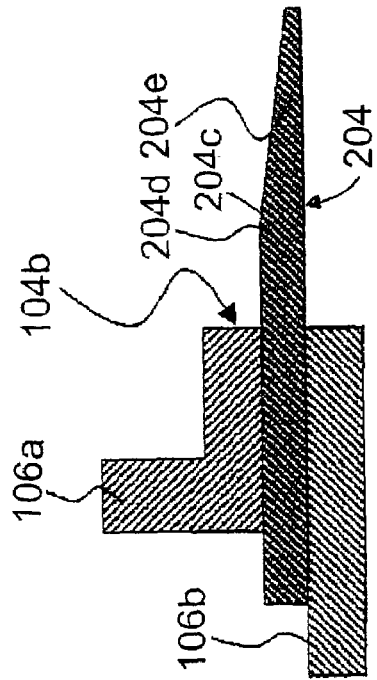
FIG. 6 is a longitudinal cross sectional view of the thin battery illustrated in FIG. 5 as seen along section line 6—6 of FIG. 5 in accordance with the second embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Referring initially to FIGS. 1 and 2, a thin battery 10 is illustrated in accordance with a first embodiment of the present invention. FIG. 1 shows a full plan view of a thin battery in accordance with the first embodiment of the present invention, while FIG. 2 shows a cross sectional view taken along line 2—2 of FIG. 1. While FIG. 1 shows one thin battery (single cell), it will be apparent that a plurality of such thin batteries 10 can be combined to form a battery pack of the desired voltage and capacity.

The overall configuration of a thin battery 10 in accordance with this first embodiment of the present invention will now described with reference to FIG. 1. The thin battery 10 is a thin secondary battery comprising two positive electrode plates 101, five separators 102, two negative electrode plates 103, a positive electrode terminal 104, a negative electrode terminal 105, a battery outer casing 106, and an electrolyte 107. The positive electrode plates 101, the separators 102, the negative electrode plates 103, and the electrolyte 107 are referred to collectively as an electrode assembly or an electricity-generating element 109.

The number of the positive electrode plates 101, the separators 102, and the negative electrode plates 103 is not limited to the illustrated embodiment. Rather, the electricity-generating element 109 can be, for example, comprised of only one of the positive electrode plates 101, three of the separators 102, and one of the negative electrode plates 103. Thus, the number of positive electrode plates, negative electrode plates, and separators can be selected as required.

The positive electrode plates 101 of the electricity-generating element 109 are made by mixing together a positive electrode active material (e.g., a metal oxide), a conductive material (e.g., carbon black), and an adhesive (e.g., a water dispersion of poly-tetra-fluoro-ethylene) at a weight ratio of, for example, 100:3:10 and coating the mixture onto both sides of a metal foil (e.g., aluminum foil) that serves as a positive electrode collector. The coated foil is then dried, rolled, and cut to a prescribed size. The ratio of water-dispersed poly-tetra-fluoro-ethylene specified above is the ratio of solid material.

Examples of positive electrode active materials that can be used include, but not limited to lithium nickel oxide (LiNiO2), lithium manganese oxide (LiMnO2), lithium cobalt oxide (LiCoO2) and other lithium compound oxides. Chalcogenides (S, Se, Te) can also be used as positive electrode active materials.

The negative electrode plates 103 of the electricity-generating element 109 are made by mixing together a negative electrode active material (e.g., amorphous carbon, not-easily-graphitized carbon, graphite, or other material that adsorbs and discharges lithium ions from the positive electrode active material) and a water dispersion of styrene butadiene rubber powder (which serves as a precursor material for a fired organic material) at a solid-material weight ratio of, for example, 100:5. The mixture is dried and then pulverized to make a main material comprising carbon particles carrying carbonized styrene butadiene rubber. This main material is then mixed with a binder, e.g., acrylic resin emulsion, at a weight ratio of 100:5 and the resulting mixture is coated onto both sides of a metal foil (e.g., nickel foil or copper foil) that serves as a negative electrode collector. The coated foil is then dried, rolled, and cut to a prescribed size.

In particular, when amorphous carbon or not-easily-graphitized carbon is used as the negative electrode active material, the flat characteristic of the potential is deficient during charging and discharging and the output voltage declines along with the discharge capacity. Therefore, these materials are not well-suited to power sources for communication devices and office devices. However, these materials are advantageous when used in power sources for electric automobiles because the output does not decline abruptly.

The separators 102 of the electricity-generating element 109 serve to prevent short circuiting between the positive electrode plates 101 and the negative electrode plates 103. The separators 102 can also have an electrolyte holding function. The separators 102 are made of a polyolefin, e.g., polyethylene (PE) or poly propylene PP), or the like. The separators 102 have the form of a micro-porous film of thickness 25 to 50 micrometers. Thus, they also have the function of shutting off current flow when excessive current occurs because the pores of the separators 102 close up when the separators 102 are heated by the current.

The separators 102 of the present invention are not limited to the form of a single-layer film of polyolefin or the like. Other forms that can be used include a three-layered structure comprising a layer of polypropylene sandwiched between two polyethylene layers and a multi-layered structure comprising layers of polyolefin micro-porous film and organic unwoven cloth. By making the separators 102 with a multi-layered structure, the excess current preventing function, the electrolyte holding function, and the shaping maintaining function (rigidity) of the separators can be improved. Instead of using the separators 102, it is also possible to use a gel electrolyte or an intrinsic polymer electrolyte as needed and/or desired.

The electricity-generating element 109 has a layered structure in which the positive electrode plates 101 and negative electrode plates 103 are stacked alternately with one of the separators 102 positioned between adjacent pairs of the positive electrode plates 101 and negative electrode plates 103. Additionally, the uppermost layer and the lowermost layer of the electricity-generating element 109 are formed by one of the separators 102. The two positive electrode plates 101 are connected to the metal foil of the positive electrode terminal 104 through a pair of positive electrode collectors 104a, and the two negative electrode plates 103 are connected to the metal foil of the negative electrode terminal 105 through a pair of negative electrode collectors 105a. There are no particular structural limitations on the positive electrode terminal 104 and the negative electrode terminal 105 so long as they are made of an electrochemically stable metal material. Examples of suitable materials include aluminum or an aluminum alloy for the positive electrode terminal 104. Examples of suitable materials include nickel, copper, or stainless steel for the negative electrode terminal 105. In this embodiment, the positive electrode collectors 104a and the negative electrode collectors 105a are all made of elongated aluminum foil, nickel foil, or copper foil. The electrode collectors 104a and 105a constitute collector bodies for the positive electrode plates 104 and the negative electrode plates 105, respectively. However, other materials and parts can be used to form the collectors 104a and 105a.

The electricity-generating element 109 is sealed inside the battery outer casing 106, which is preferably constructed of an upper casing part 106a and a lower casing part 106b. The upper casing part 106a and the lower casing part 106b are preferably made of a flexible material, such as a resin film made of polyethylene or polypropylene or a resin-metal thin-film laminate comprising a metal foil (e.g., aluminum) laminated with polyethylene, polypropylene, or other resin. For example, the resin film that comprises the inside surfaces of the casing parts 106a and 106b can be made of polyethylene, polypropylene, polyamide, ionomer resin, or other resin that has excellent chemical resistance to electrolytes and excellent heat sealing ability around the outer edges. The intermediate layer of the casing parts 106a and 106b can be made of aluminum foil, stainless steel foil, or other metal foil having excellent strength and pliability. The resin film that comprises the outer surfaces of the casing parts 106a and 106b can be made of a polyamide resin, a polyester resin, or other resin having excellent electrical insulating characteristics.

The casing parts 106a and 106b enclose the electricity-generating element 109, a pair of positive electrode collectors 104a, a base portion 104d of the positive electrode terminal 104, a pair of negative electrode collector 105a, and a base portion 105d of the negative electrode terminal 105. The space between the casing parts 1 06a and 106b is filled with the liquid electrolyte 107 preferably comprising a lithium salt (e.g., lithium perchlorate or lithium fluoroboride) solute dissolved in an organic liquid solvent. Then, the outside edges of the upper casing part 106a and the lower casing part 106b are sealed by thermal fusing or other sealing method.

Examples of the organic liquid solvent include propylene carbonate (PC), ethylene carbonate (EC), dimethylcarbonate (DMC), and other ester-based solvents. However, the organic liquid solvent of the present invention is not limited to these examples. It is also possible to use a blended organic liquid solvent comprising a mixture of an ester-based solvent and an ether-based solvent, e.g., γ-butyl lactone (γ-BL) or diethoxyethane (DEE).

As shown in FIG. 1 and 2, the positive electrode terminal 104 protrudes from one end of the sealed battery outer casing 106. Accordingly, a gap corresponding to the thickness of the positive electrode terminal 104 exists at the portion where the casing parts 106a and 106b are joined together. In order to maintain the sealed state of the inside of the thin battery 10, it is also possible to use thermal fusing or another method provide sealing films made of polyethylene or polypropylene at the portions where the positive electrode terminal 104 contacts the battery outer casing 106.

Similarly to the positive electrode terminal 104, the negative electrode terminal 105 protrudes from the other end of the sealed battery outer casing 106 and thermal fusing or other method can be used to provide sealing films made at the portions where the negative electrode terminal 105 contacts the battery outer casing 106. From the standpoint of thermal fusibility, it is preferable to make the seal films for both the positive electrode terminal 104 and the negative electrode terminal 105 out of the same or similar type of resin as the resin that forms the casing parts 106a and 106b.

FIG. 3 is an enlarged partial top plan view of the thin battery 10 showing the positive electrode terminal 104 portion of FIG. 1. The positive and negative electrode terminals 104 and 105 are provided so as to protrude from the outer edges 104b and 105b. respectively, of the portions where the upper battery casing parts 106a and 106b are joined together. In this embodiment, the positive and negative electrode terminals 104 and 105 are made of aluminum foil or other metal foil as previously described. The positive and negative electrode terminals 104 and 105 are identical in construction. Thus, only the positive electrode terminal 104 will be shown in detail.

As shown in FIG. 3, the tip portion 104e only is annealed before the positive electrode terminal 104 is connected to the positive electrode collectors 104a. Thus, the hardness of the tip portion 104e of the positive electrode terminal 104, which was hardened by the forming process, is reduced in comparison with the base portion 104d (e.g., the rest of the terminal). As a result, as shown in FIG. 4, the material hardness drops abruptly at a distance L toward the tip portion 104e from the outer edge 104b of the battery outer casing 106, i.e., at the position of a boundary line 104c between the tip portion 104e (annealed) and the base portion 104d (untreated) of the positive electrode terminal 104. In short, by reducing the hardness of the tip portion 104e of the positive electrode terminal 104, the material strength of the positive electrode terminal 104 at the outer edge 104b of the battery outer casing 106 is comparatively increased. This boundary line 104c corresponds to the electrode terminal strength transition point of the present invention.

As used herein, the term "material strength" refers to the relative deflection or bending of the electrode terminal when a force is applied in a direction substantially perpendicular to the side surface of the electrode terminal. For example, the tip portion 104e (annealed) and the base portion 104d (untreated) of the positive electrode terminal 104 have different "material strengths" due to their relative hardness. Alternatively, the tip and base portions of the electrode terminals can have the same hardness, but different "material strengths" due to their relative shapes.

Although omitted in FIG. 3, the tip portion 105e of the negative electrode terminal 105 is also annealed and the base portion 105d is left untreated such that a linear boundary line 105c is formed at a position that is corresponding to the position of the boundary line 104c of the positive terminal 104 linearly symmetrical to that shown in FIG. 3.

In other words, in the present invention, the base portions 104d and 105d of the electrode terminals 104 and 105 are partially located with the battery outer casing 106 and partially extend outwardly from the battery outer casing 106. Thus, the strength transition points or boundary line 104c and 105c of the electrode terminals 104 and 105 are offset from the outer edges 104b and 105b of the battery outer casing 106 in the outward direction (i.e., away from the battery casing 106). Consequently, when an external force acts on an electrode terminal, or when an electrode terminal is displaced, the resulting stress and strain generated in the electrode terminal are prevented from concentrating at the outside edge of the battery outer casing. Since the strength transition point of the electrode terminals 104 and 105 are offset from the outer edges of the battery outer casing 106, the stress and strain generated in the electrode terminals tend to concentrate at the strength transition point and the stress and strain can be dispersed to both the outer edges of the battery outer casing 106 and the strength transition points 104c and 105c. As a result, the durability of the electrode terminals 104 and 105 are improved and can have an extended life.

Consequently, when several of the thin batteries 10 according to this embodiment are stacked and connected with a bus bar or the like to make a battery pack and the positive electrode terminals 104 and the negative electrode terminals 105 are subjected to external force or displaced, the resulting stresses and strains generated in the positive electrode terminals 104 and the negative electrode terminals 105 are dispersed to both the boundary lines 104c and the outer edges 104b of the battery outer casing 106. As a result, the electrode terminals 104 and 105 do not break when subjected to the same break at the outer edge 104b of the battery outer casing 106 and the overall service life of the electrode terminals 104 and 105 is extended.

Second Embodiment

Figure 7:
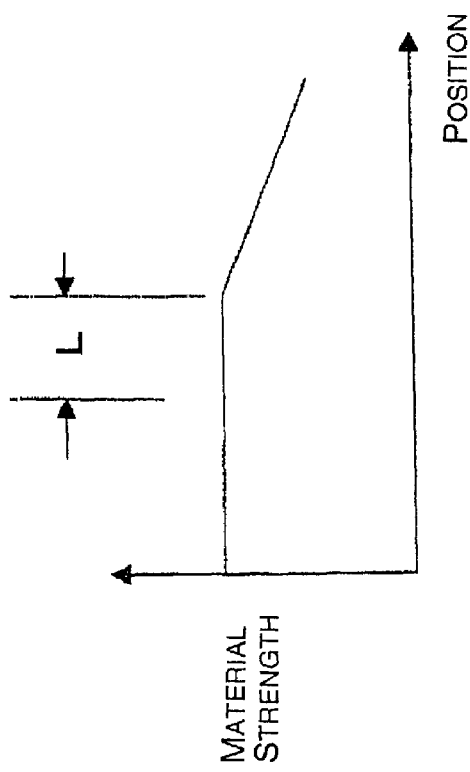
FIG. 7 is a graph showing the material strength of the positive electrode terminal relative to the longitudinal position in accordance with the second embodiment of the present invention.
Figure 5:
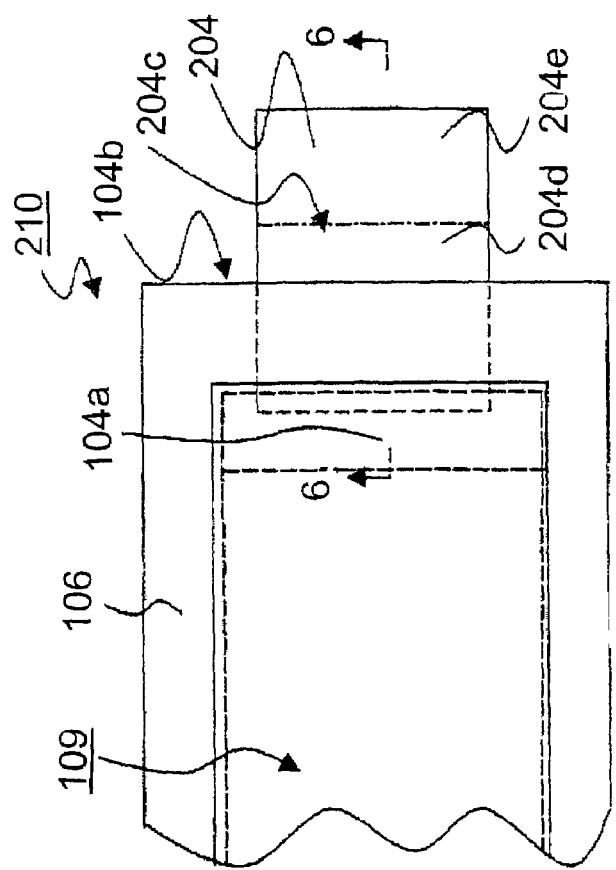
FIG. 5 is an enlarged partial top plan view showing a thin battery in accordance with a second embodiment of the present invention.

Referring now to FIGS. 5–7, a thin battery 210 in accordance with a second embodiment will now be explained. Basically, the thin battery 210 is identical to the thin battery 10, as discussed above, except for the electrode terminals have been modified. In other words, the thin battery 210 as a positive electrode terminal 204 and a negative electrode terminal (not shown) that are used instead of the electrode terminals 104 and 105 of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 5 is an enlarged partial top plan view of the thin battery 210 showing a portion, including the positive electrode terminal 204, that corresponds to a portion of the thin battery 10 including the positive electrode terminal 104 illustrated in FIG. 1. Similar to the first embodiment, the positive electrode terminal 204 of the second embodiment is provided so as to protrude from the outer edge 104b of the battery outer casing 106. The positive electrode terminal 204 includes a base portion 204d having a first material strength and a tip portion 204e having a second material strength that is lower than the first material strength of the base portion 204d with a strength transition point formed between the base and tip portions 204d and 204e at a location spaced from the battery outer casing 106. The base portion 204d is partially located within the battery outer casing 106 and partially outside of the battery outer casing 106. Of course, the negative electrode terminal (not shown) in this embodiment has the same structure as the positive electrode terminal 204, but extends out from the opposite end of the battery outer casing 106.

Here, although the positive electrode terminal 204 is made of aluminum foil or other metal foil as in the previous embodiment, the tip portion 204e is machined or processed such that its thickness tapers gradually thinner, as shown in the FIG. 6, before the positive electrode terminal 204 is connected to the positive electrode collectors 104a.

Consequently, the strength of the tapered tip portion 204e of the positive electrode terminal 204 is reduced in comparison with the base portion 204d (e.g., the rest of the terminal). In other words, the tip and base portions of the electrode terminals have the same hardness, but different "material strengths" due to their relative shapes. As a result, as shown in FIG. 6, the material strength decreases gradually as one moves toward the tip from a position at a distance L from the outer edge 104b of the battery outer casing 106, i.e., from the position of the boundary line 204c between the tip portion 204e (tapered) and the base portion 204d (untreated) of the positive electrode terminal 204. In short, by reducing the strength of the tip portion 204e of the positive electrode terminal 204, the strength of the positive electrode terminal 204 at the outer edge of the battery outer casing 106 is comparatively increased. This boundary line 204c corresponds to the electrode terminal strength transition point of the present invention.

Although omitted in the figures, the tip portion of the negative electrode terminal of the thin battery 210 is also machined so as to taper gradually thinner and the base portion is left un-machined such that a linear boundary line is formed at a position that is linearly symmetrical to that shown in FIGS. 5 and 6.

Consequently, when a plurality of thin batteries 210 according to this embodiment are stacked and connected with a bus bar or the like to make a battery pack and the positive and negative electrode terminals are subjected to external force or displaced, the resulting stresses and strains generated in the positive and negative electrode terminals are dispersed to both the regions from the boundary lines 204c to the tips and the outer edges of the battery outer casing 106. As a result, the electrode terminals do not break when subjected to the same number of durability test repetitions as would cause a conventional electrode terminal to break at the outer edges of the battery outer casing 106 and the overall service life of the electrode terminals is extended.

Third Embodiment

Figure 8:
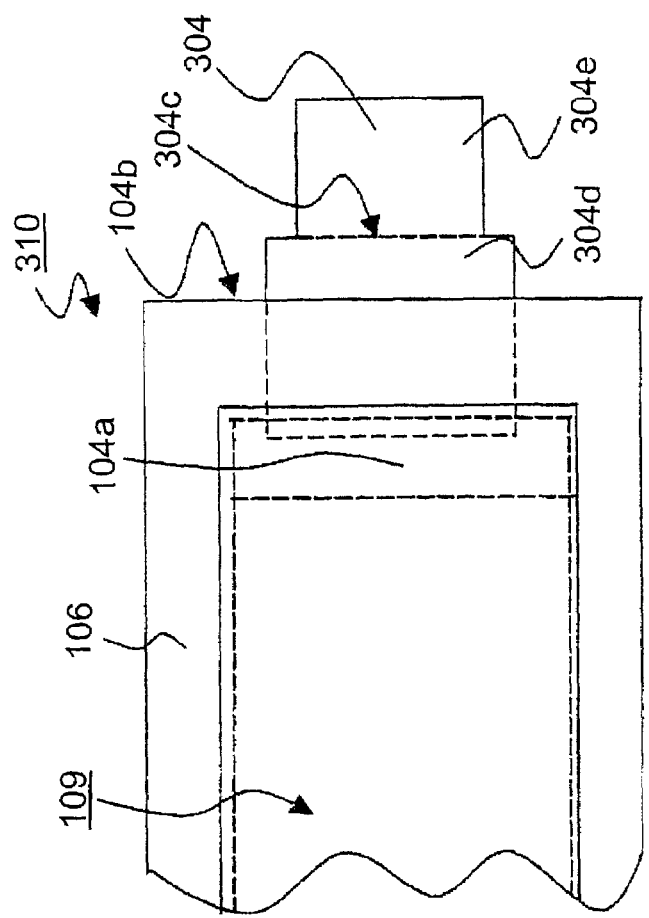
FIG. 8 is an enlarged partial top plan view showing a thin battery in accordance with a third embodiment of the present invention.
Figure 9:
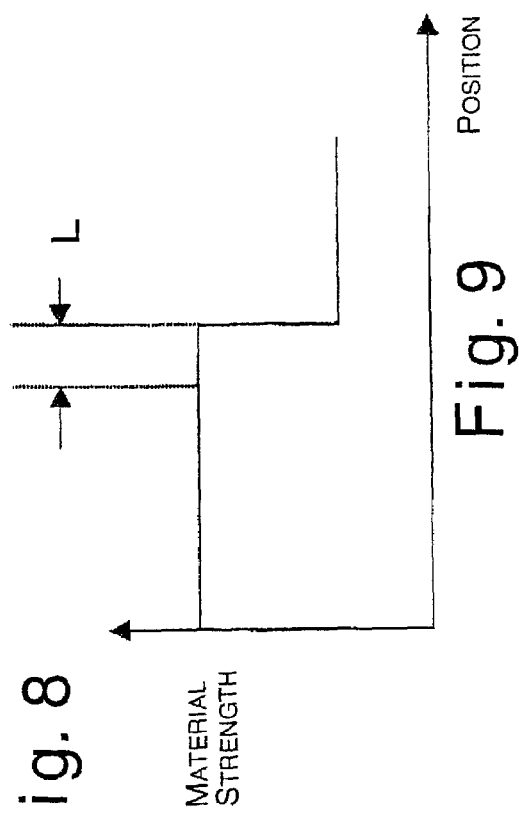
FIG. 9 is a graph showing the material strength of the positive electrode terminal relative to the longitudinal position in accordance with the third embodiment of the present invention.

Referring now to FIGS. 8–9, a thin battery 310 in accordance with a third embodiment will now be explained. Basically, the thin battery 310 is identical to the thin battery 10, as discussed above, except for the electrode terminals have been modified. In other words, the thin battery 310 as a positive electrode terminal 304 and a negative electrode terminal (not shown) that are used instead of the electrode terminals 104 and 105. In view of the similarity between the third embodiment and the prior embodiments, the parts of the third embodiment that are identical to the parts of the prior embodiments will be given the same reference numerals. Moreover, the descriptions of the parts of the third embodiment that are identical to the parts of the prior embodiments may be omitted for the sake of brevity.

FIG. 8 is an enlarged partial top plan view of the thin battery 310 showing a portion, including the positive electrode terminal 304, that corresponds to a portion of the thin battery 10 including the positive electrode terminal 104 illustrated in FIG. 1. Similar to the first embodiment, the positive electrode terminal 304 is provided so as to protrude from the outer edge 104b of the battery outer casing 106. The positive electrode terminal 304 includes a base portion 304d having a first material strength and a tip portion 304e having a second material strength that is lower than the first material strength of the base portion 304d with a strength transition point formed between the base and tip portions 304d and 304e at a location spaced from the battery outer casing 106. The base portion 304d is partially located within the battery outer casing 106 and partially outside of the battery outer casing 106. Of course, the negative electrode terminal (not shown) in this embodiment has the same structure as the positive electrode terminal 304, but extends out from the opposite end of the battery outer casing 106.

Here, although the positive electrode terminal 304 is made of aluminum foil or other metal foil as in the previous embodiments, the tip portion 304e is machined such that its width is narrowed (as shown in the figure) before the positive electrode terminal 304 is connected to the positive electrode collectors 104a.

Consequently, the strength of the narrowed tip portion 304e of the positive electrode terminal 304 is reduced in comparison with the base portion 304d (e.g., the rest of the terminal). In other words, the tip and base portions of the electrode terminals have the same hardness, but different "material strengths" due to their relative shapes. As a result, as shown in FIG. 9, the material strength decreases abruptly at a distance L toward the tip from the outer edge 104b of the battery outer casing 106, i.e., at the boundary line 304c between the tip portion 304e (narrowed) and the base portion 304d (untreated) of the positive electrode terminal 304. In short, by reducing the strength of the tip portion 304e of the positive electrode terminal 304, the strength of the positive electrode terminal 304 at the outer edge 104b of the battery outer casing 106 is comparatively increased. This boundary line 304c corresponds to the electrode terminal strength transition point of the present invention.

Although omitted in the figure, the tip portion of the negative electrode terminal is also machined so to be narrower and the base portion is left un-machined such that a linear boundary line is formed at a position that is linearly symmetrical to that shown in FIG. 8.

Consequently, when a plurality of thin batteries 310 according to this embodiment are stacked and connected with a bus bar or the like to make a battery pack and the positive and negative electrode terminals are subjected to external force or displaced, the resulting stress and strain generated in the positive and negative electrode terminals is dispersed to both the boundary lines and the outer edges of the battery outer casing 106. As a result, the electrode terminals do not break when subjected to the same number of durability test repetitions as would cause a conventional electrode terminal to break at the outer edges of the battery outer casing 106 and the overall service life of the electrode terminal is extended.

Fourth Embodiment

Figure 10:
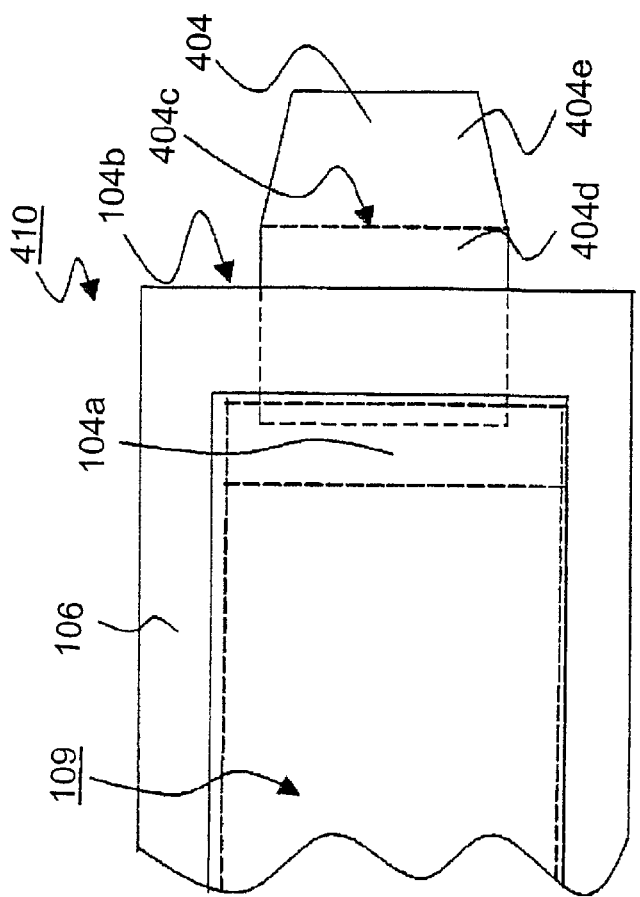
FIG. 10 is an enlarged partial top plan view showing a thin battery in accordance with a fourth embodiment of the present invention.
Figure 11:
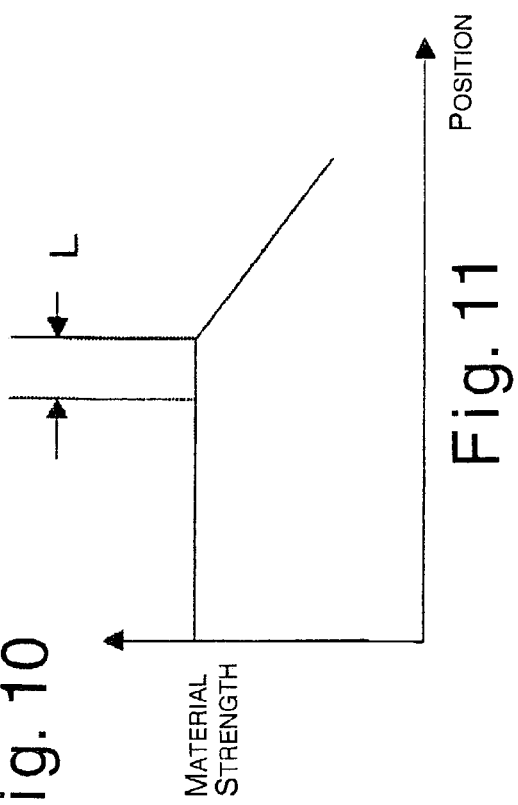
FIG. 11 is a graph showing the material strength of the positive electrode terminal relative to the longitudinal position in accordance with the fourth embodiment of the present invention.

Referring now to FIGS. 10 and 11, a thin battery 410 in accordance with a fourth embodiment will now be explained. Basically, the thin battery 410 is identical to the thin battery 10, as discussed above, except for the electrode terminals have been modified. In other words, the thin battery 410 as a positive electrode terminal 404 and a negative electrode terminal (not shown) that are used instead of the electrode terminals 104 and 105. In view of the similarity between the fourth embodiment and the prior embodiments, the parts of the fourth embodiment that are identical to the parts of the prior embodiments will be given the same reference numerals. Moreover, the descriptions of the parts of the fourth embodiment that are identical to the parts of the prior embodiments may be omitted for the sake of brevity.

FIG. 10 is an enlarged partial top plan view of the thin battery 410 showing a portion, including the positive electrode terminal 404, that corresponds to a portion of the thin battery 10 including the positive electrode terminal 104 illustrated in FIG. 1. Similar to the first embodiment, the positive electrode terminal 404 is provided so as to protrude from the outer edge 104b of the battery outer casing 106. The positive electrode terminal 404 includes a base portion 404d having a first material strength and a tip portion 404e having a second material strength that is lower than the first material strength of the base portion 404d with a strength transition point formed between the base and tip portions 404d and 404e at a location spaced from the battery outer casing 106. The base portion 404d is partially located within the battery outer casing 106 and partially outside of the battery outer casing 106. Of course, the negative electrode terminal (not shown) in this embodiment has the same structure as the positive electrode terminal 404, but extends out from the opposite end of the battery outer casing 106.

Here, although the positive electrode terminal 404 is made of aluminum foil or other metal foil as in the previous embodiments, the tip portion 404e is machined such that its width tapers gradually narrower (as shown in the figure) before the positive electrode terminal 404 is connected to the positive electrode collectors 104a.

Consequently, the strength of the gradually narrowed tip portion 404e of the positive electrode terminal 404 is reduced in comparison with the base portion 404d (e.g., the rest of the terminal). In other words, the tip and base portions of the electrode terminals have the same hardness, but different "material strengths" due to their relative shapes. As a result, as shown in FIG. 11, the material strength decreases gradually as one moves toward the tip from a position at a distance L from the outer edge 104b of the battery outer casing 106, i.e., from the position of the boundary line 404c between the tip portion 404e (gradually narrowed) and the base portion 404d (untreated) of the positive electrode terminal 404. In short, by reducing the strength of the tip portion 404e of the positive electrode terminal 404, the strength of the positive electrode terminal 404 at the outer edge 104b of the battery outer casing 106 is comparatively increased. This boundary line 404c corresponds to the electrode terminal strength transition point of the present invention.

Although omitted in the figure, the tip portion of the negative electrode terminal is also machined so as to narrow gradually and the base portion is left un-machined such that a linear boundary line is formed at a position that is linearly symmetrical to that shown in the figure.

Consequently, when a plurality of thin batteries 410 according to this embodiment are stacked and connected with a bus bar or the like to make a battery pack and the positive and negative electrode terminals are subjected to external force or displaced, the resulting stresses and strains generated in the positive and negative electrode terminals are dispersed to both the regions from the boundary lines to the tips and the outer edges of the battery outer casing 106. As a result, the electrode terminals do not break when subjected to the same number of durability test repetitions as would cause a conventional electrode terminal to break at the outer edges of the battery outer casing 106 and the overall service life of the electrode terminals is extended.

Fifth Embodiment

Figure 12:
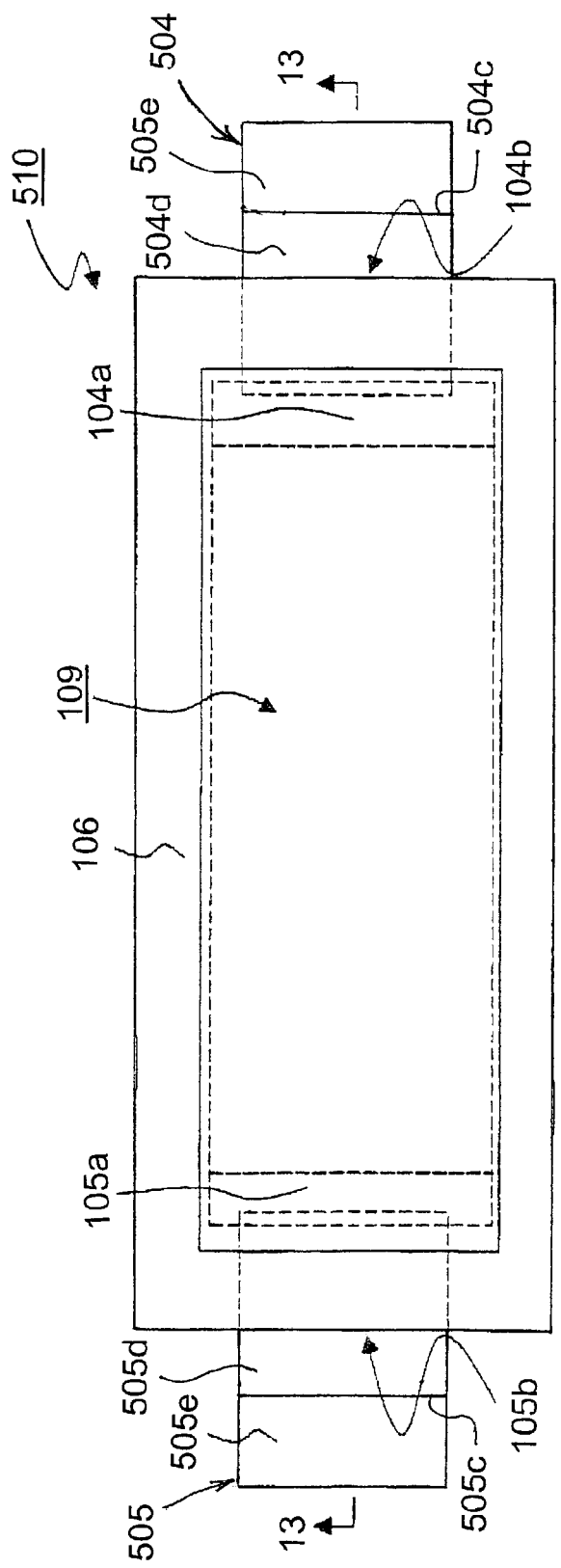
FIG. 12 is a full top plan view of a thin battery in accordance with a first embodiment of the present invention.
Figure 13:
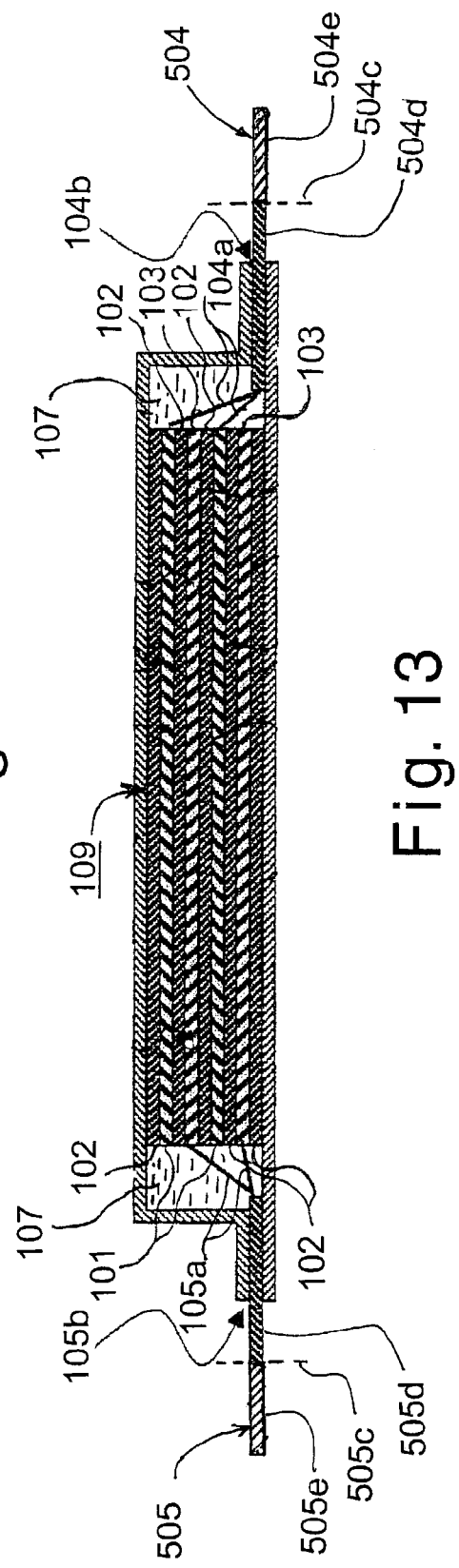
FIG. 13 is a longitudinal cross sectional view of the thin battery illustrated in FIG. 1 as seen along section line 13—13 of FIG. 12 in accordance with the fifth embodiment of the present invention.

Referring now to FIGS. 12 and 13, a thin battery 510 in accordance with a fifth embodiment will now be explained. Basically, the thin battery 510 is identical to the thin battery 10, as discussed above, except for the electrode terminals have been modified. In other words, the thin battery 510 as a positive electrode terminal 504 and a negative electrode terminal 505 that are used instead of the electrode terminals 104 and 105. In view of the similarity between the fifth embodiment and the prior embodiments, the parts of the fourth embodiment that are identical to the parts of the prior embodiments will be given the same reference numerals. Moreover, the descriptions of the parts of the fifth embodiment that are identical to the parts of the prior embodiments may be omitted for the sake of brevity.

FIG. 12 shows a full plan view of the thin battery 510, while FIG. 13 shows a cross sectional view taken along line 13–13 of FIG. 12. Similar to the first embodiment, the positive and negative electrode terminals 504 and 505 are provided so that they protrude outwardly from the outer edges 104b and 105b of the battery outer casing 106. Here, the positive and negative electrode terminals 504 and 505 are made of at least two different materials that are fixedly joined together. In particular, the positive electrode terminal 504 includes a base portion 504d constructed of a first material having a first material strength and a tip portion 504e constructed of a second material having a second material strength that is lower than the first material strength of the base portion 504d with a strength transition point formed between the base and tip portions 504d and 504e at a location spaced from the battery outer casing 106. The base portion 504d is partially located within the battery outer casing 106 and partially outside of the battery outer casing 106. Of course, the negative electrode terminal 505 includes a base portion 505d having a first material strength and a tip portion 505e having a second material strength that is lower than the first material strength of the base portion 505d with a strength transition point formed between the base and tip portions 505d and 505e at a location spaced from the battery outer casing 106. The base portion 505d is partially located within the battery outer casing 106 and partially outside of the battery outer casing 106. Preferably, aluminum foil and/or other metal foil are used in constructing the positive and negative electrode terminals 504 and 505.

Consequently, the strength of the tip portion 504e of the positive electrode terminal 504 is reduced in comparison with the base portion 504d (e.g., the rest of the terminal). In other words, the tip and base portions of the electrode terminals have different "material strengths" due to their different materials, e.g., different hardness. As a result, the casing 106 is comparatively increased. This boundary line 404c corresponds to the electrode terminal strength transition point of the present invention. material hardness or strength drops abruptly at a predetermined distance L toward the tip portion 504e from the outer edge 504b of the battery outer casing 106, i.e., at the position of a boundary line 504c between the tip portion 504e and the base portion 504d of the positive electrode terminal 504, similar to the first embodiment as shown in FIG. 4. In short, by reducing the hardness of the tip portion 504e of the positive electrode terminal 104, the material strength of the positive electrode terminal 504 at the outer edge 104b of the battery outer casing 106 is comparatively increased. Likewise, the material hardness or strength drops abruptly at the position of a boundary line 505c between the tip portion 505e and the base portion 505d of the negative electrode terminal 505. This boundary line 504c or 505c corresponds to the electrode terminal strength transition point of the present invention.

Consequently, when a plurality of thin batteries 510 according to this embodiment are stacked and connected with a bus bar or the like to make a battery pack and the positive and negative electrode terminals 504 and 505 are subjected to external force or displaced, the resulting stresses and strains generated in the positive and negative electrode terminals 504 and 505 are dispersed to both the regions from the boundary lines to the tips and the outer edges of the battery outer casing 106. As a result, the electrode terminals do not break when subjected to the same number of durability test repetitions as would cause a conventional electrode terminal to break at the outer edges of the battery outer casing 106 and the overall service life of the electrode terminals is extended.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-186123. The entire disclosure of Japanese Patent Application No. 2002-186123 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A thin battery comprising:
   a battery outer casing;
   an electricity-generating element disposed inside the battery outer casing, the electricity-generating element including a positive electrode plate, a negative electrode plate, and a separator that are stacked together;
   a first electrode terminal electrically connected to the electricity-generating element; and
   a second electrode terminal electrically connected to the electricity-generating element and extending outwardly from the battery outer casing, the second electrode terminal including a base portion having a first material strength and a tip portion with a strength transition point formed between the base and tip portions at a location spaced from the battery outer casing, the tip portion having a free end with an entire area of the tip portion from the strength transition point to the free end having a second material strength that is lower than the first material strength of the base portion, the base portion and the tip portion being formed as a one-piece unitary member, the first and second material strengths being formed by the one-piece unitary member without an additional material.

2. The thin battery as recited in claim 1, wherein the tip portion is annealed such that the second material strength is lower than the first material strength and the strength transition point of the second electrode terminal is formed.

3. The thin battery as recited in claim 1, wherein the tip portion has a smaller wall thickness than the base portion such that the second material strength is lower than the first material strength and the strength transition point of the second electrode terminal is formed.

4. The thin battery as recited in claim 3, wherein
the wall thickness of the tip portion becomes gradually thinner as the tip portion extends away from the base portion.
5. The thin battery as recited in claim 1, wherein
the tip portion has a narrower width than the base portion such that the second material strength is lower than the first material strength and the strength transition point of the second electrode terminal is formed.
6. The thin battery as recited in claim 5, wherein
the tip portion becomes gradually narrower as the tip portion extends away from the base portion.
7. The thin battery as recited in claim 1, wherein
the positive electrode plate of the electricity-generating element has an active material that includes a lithium component.
8. The thin battery as recited in claim 7, wherein
the lithium component of the active material of the positive electrode plate includes at least one of a lithium manganate and a lithium nickelate.
9. The thin battery as recited in claim 7, wherein
the negative electrode plate of the electricity-generating element has an active material that includes amorphous carbon.
10. The thin battery as recited in claim 8, wherein
the separator of the electricity-generating element has a thickness that is between about 25 micrometers to about 50 micrometers.
11. A thin battery comprising:
a battery outer casing;
an electricity-generating element disposed inside the battery outer casing, the electricity-generating element including a positive electrode plate, a negative electrode plate, and a separator that are stacked together;
a first electrode terminal electrically connected to the electricity-generating element, the first electrode terminal extending outwardly from an outer edge of the battery outer casing, the first electrode terminal including a first base portion having a first material strength and a first tip portion with a first strength transition point formed between the first base portion and the first tip portion of the first electrode terminal at a location spaced from the battery outer casing, the first tip portion having a first free end with an entire area of the first tip portion from the first strength transition point to the first free end having a second material strength that is lower than the first material strength of the first base portion, the first base portion and the first tip portion being formed as a one-piece unitary member, the first and second material strengths being formed by the one-piece unitary member without an additional material; and
a second electrode terminal electrically connected to the electricity-generating element and extending outwardly from the battery outer casing, the second electrode terminal including a second base portion having the first material strength and a second tip portion with a second strength transition point formed between the second base portion and the second tip portion at a location spaced from the battery outer casing, the second tip portion having a second free end with an entire area of the second tip portion from the second strength transition point to the second free end having the second material strength that is lower than the first material strength of the second base portion, the second base portion and the second tip portion being formed as a one-piece unitary member, the first and second material strengths being formed by the one-piece unitary member without an additional material.
12. The thin battery as recited in claim 11, wherein
the first and second tip portions of the first and second electrode terminals are annealed such that the second material strengths are lower than the first material strengths of the first and second electrode terminals, and the first and second strength transition points of the first and second electrode terminals are formed therebetween, respectively.
13. The thin battery as recited in claim 11, wherein
the first and second tip portions of the first and second electrode terminals have smaller wall thicknesses than the first and second base portions of the first and second electrode terminals such that the second material strengths are lower than the first material strengths, and the first and second strength transition points of the first and second electrode terminals are formed therebetween, respectively.
14. The thin battery as recited in claim 13, wherein
the wall thicknesses of the first and second tip portions of the first and second electrode terminals become gradually thinner as the first and second tip portions of the first and second electrode terminals extend away from the first and second base portions of the first and second electrode terminals, respectively.
15. The thin battery as recited in claim 11, wherein
the first and second tip portions are narrower in width than the first and second base portions such that the second material strengths are lower than the first material strengths, and the first and second strength transition points of the first and second electrode terminals are formed therebetween, respectively.
16. The thin battery as recited in claim 15, wherein
the first and second tip portions of the first and second electrode terminals become gradually narrower as the first and second tip portions of the first and second electrode terminals extend away from the first and second base portions of the first and second electrode terminals, respectively.
17. The thin battery as recited in claim 11, wherein
the positive electrode plate of the electricity-generating element has an active material that includes a lithium component of at least one of a lithium manganate and a lithium nickelate;
the negative electrode plate of the electricity-generating element has an active material that includes amorphous carbon; and
the separator of the electricity-generating element has a thickness that is between about 25 micrometers to about 50 micrometers.
18. A thin battery comprising:
electricity-generating means for storing and producing electricity;
outer casing means for enclosing the electricity-generating means;
first electrode terminal means for electrically connecting to the electricity-generating element; and
second electrode terminal means for electrically connecting to the electricity-generating means, the second electrode terminal means including a base portion having a first material strength and a tip portion having a second material strength with a strength transition point of material strength formed between the base and tip portions at a location spaced from outwardly from of the outer casing means, the tip portion having a free end with an entire area of the tip portion from the strength transition point to the free end having a second material strength that is lower than the first material strength of the base portion, the base portion and the tip portion being formed as a one-piece unitary member, the first and second material strengths being formed by the one-piece unitary member without an additional material.

* * * * *